June 16, 1925.

S. GOBOS

HYDRAULIC RECOIL CHECK

Filed May 14, 1924

1,542,054

Inventor:
Stefan Gobos

Patented June 16, 1925.

1,542,054

UNITED STATES PATENT OFFICE.

STEFAN GOBOS, OF CHICAGO, ILLINOIS.

HYDRAULIC RECOIL CHECK.

Application filed May 14, 1924. Serial No. 713,183.

*To all whom it may concern:*

Be it known that I, STEFAN GOBOS, a citizen of Yugoslavia (who has declared his intention of becoming a citizen of the United States), residing at Chicago, county of Cook, State of Illinois, have invented a certain new and useful Improvement in Hydraulic Recoil Checks, and declare the following to be a full, clear, and exact description of the same, such as will enable others skilled in the art to which it pertains to make and use the same, reference being had to the accompanying drawing, which forms a part of this specification.

The present invention relates to devices for producing a dampening effect on the relative movements of two parts, such as the body and the axle of an automobile, particularly of the type in which the movement of a retarding member is resisted by oil or other liquid; and it has for its object to produce a simple, compact and rugged construction made of a few simple parts that can readily be adapted to offer any desired resistance to movement in either of two directions and which may be caused to offer a high resistance to movement in one direction and comparatively little resistance to movement in the other direction.

In carrying out my invention I employ a casing having a cylindrical or partially cylindrical wall, and place within set casing a radial wing or vane that swings about the cylindrical axis and has a radially-yieldable end that is normally held tightly against the wall of the casing but may be forced back to permit the passage of liquid between the same and the wall; this wing or vane therefore serving as an automatic valve. Therefore, viewed in one of its aspects, my invention may be said to have for its object to produce a simple and novel checking or dampening device employing a swinging part adapted to yield in the radial direction so as to function both as a dampening element and as a valve.

Figure 1:
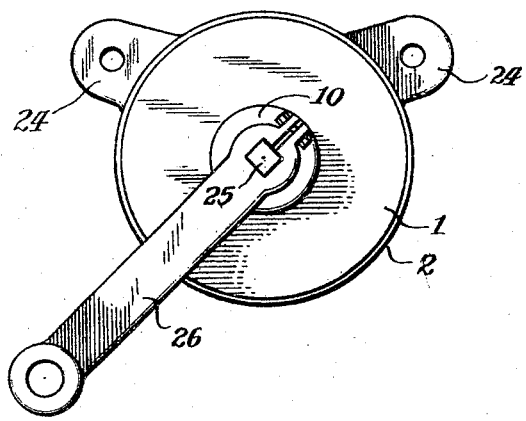
Figure 2:
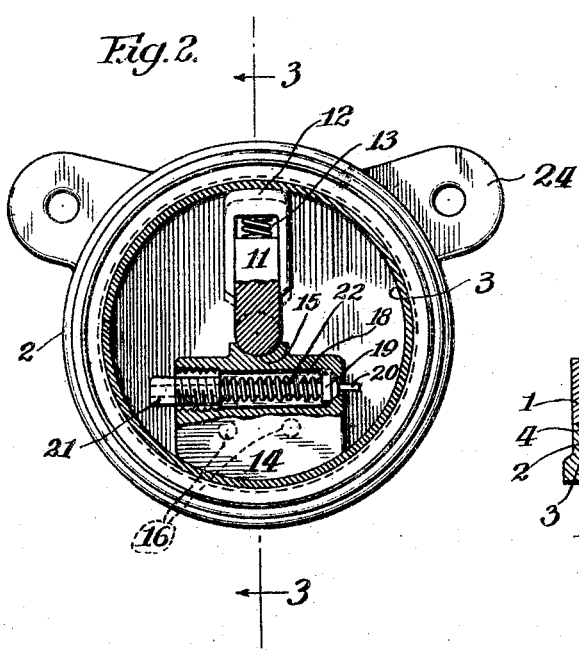
Figure 3:
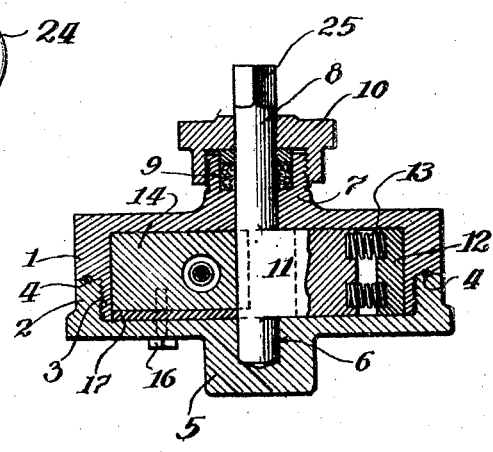

The various features of novelty whereby my invention is characterized will hereinafter be pointed out with particularity in the claims; but for a full understanding of my invention and of its objects and advantages, reference may be had to the following detailed description taken in connection with the accompanying drawing, wherein:

Figure 1 is a side view of the device arranged in accordance with my invention; Fig. 2 is a view partly in section and partly in elevation, on a larger scale than Fig. 1, corresponding otherwise to Fig. 1; and Fig. 3 is a section taken approximately on line 3—3 of Fig. 2.

Referring to the drawing, 1 and 2 represent two-halves of a casing in the form of a shallow cylinder suitably fastened together in such a manner that liquid cannot leak through the joint. In the arrangement shown the member 1 has a part 3 that is screwed into the member 2 and there may be placed between the engaging edges of the members 1 and 2, a suitable gasket 4. The member 2 has a projecting hub 5 provided with a socket 6 opening into the interior of the casing while the member 1 has a hub 7 bored out at the center to produce a cylindrical opening in axial alignment with the socket 6. There is a shaft 8 extending through the hub 7 and into the socket in the hub 5. The opening in the outer end of the hub 7 is enlarged to receive a suitable packing 9; and there is a cap 10, surrounding the shaft 8, screwed upon the hub for the purpose of pressing the packing tightly around the shaft.

Fixed to or forming part of the shaft, is a radial block 11 that fits between the end walls of the casing but is considerably shorter in the radial direction, than the radius of the interior of the casing. The outer end of the member 11 fits into a U-shaped block 12 between the cross member or yoke portion of which and the end of the member 11 are placed springs 13. These springs are of any desired strength and, it will be seen, press the member 12 outwardly against the cylindrical wall of the casing. The part 12 is of the same thickness or height, measured in a direction parallel with the axis of the shaft as the corresponding dimension of the chamber in the casing. Consequently the members 11 and 12, combined, form a swinging piston extending across a radius of the interior of the casing and fitting between the end walls of the casing.

Between the shaft 8 and some point in the cylindrical wall of the casing is a barrier which will prevent the passage of fluids. In the arrangement shown, this barrier is in the form of a comparatively wide block 14 curved along its outer edge to fit the cylindrical surface of the casing, and having at its inner edge a curved seat 15 fitting against the shaft. For convenience of manufacture, the member 14 is preferably made as a separate piece and is fastened into one-half of the casing, conveniently by means of stud bolts 16. For further simplifying the manufacture, there may be placed between the member 14, and the flat wall to which it is attached, a liner 17 of fibre or other material that may be compressed slightly when the parts of the casing are screwed together and thus insure a tight joint between the end walls of the casing and the corresponding faces of the block.

It will be seen that if the casing is filled with oil or other liquid, the shaft cannot be turned unless the liquid is able to pass from one side of the swinging piston to the other. This interchange of liquid can occur only, if all of the parts are nicely fitted, through the recession of the part 12 from the wall of the casing so as to provide a passage between the end of the piston and the wall. When the force tending to turn the shaft becomes great enough, the fluid will enter between the end of the piston and the wall of the casing and, since the pressure is equal in all directions, the sliding end or extension of the piston will be pressed radially toward the longitudinal axis of the cylinder, providing a passage through which the liquid can escape from one side of the piston to the other. If the springs 13 are made light, it will not take a very great force to turn the shaft but, by properly choosing the strength of the springs, the resistance to a turning movement of the shaft may be made great.

Recoil checks for automobiles and the like usually do not offer any considerable resistance to the compression of the vehicle springs, coming into play only on the rebound. Therefore, if it be desired that the resistance to a turning movement of the shaft in one direction be less than to a movement in the other direction, a second passage may be provided for a transfer of the liquid. This may conveniently be accomplished by means of a passage, as indicated at 18, extending through the block or barrier 14, to connect the chamber on one side of the piston with the chamber on the other side. Associated with this passage there may be a check valve that will close the passage under a pressure in one direction, namely, the direction of movement of the shaft to which the greater resistance is to be offered, but will open under a pressure in the other direction and permit a more or less free flow of liquid through the passage. In the arrangemen shown, there is a check valve 19 arranged within the passage and fixed to a rod 20 that extends lengthwise through the passage and into or through a plug 21 screwed into one end of the passage; the plug being flattened on one or more sides to provide an outlet. On the rod between the plug and the valve, is a spring 22 that normally holds the valve closed.

In order to adapt the device for use on automobiles or other vehicles, the member 2 of the casing may be provided with ears 24 for attachment to the vehicle frame while the outer end of the shaft may be squared, as indicated at 5, to receive an operating lever 26 that may be connected in any suitable way to the vehicle axle.

While I have illustrated and described with particularity only a single form of my invention, I do not desire to be limited to the exact structural details thus illustrated and described; but intend to cover all forms and arrangements which come within the terms employed in the definitions of my invention constituting the appended claims.

I claim:

1. In combination, a closed casing adapted to be filled with liquid, a movable partition extending across said casing and dividing it into two chambers, said partition consisting of two telescoped parts and springs between said parts tending to increase the effective length of the partition and permitting the effective length to be automatically decreased to provide a passage between said chambers, and means for moving said partition.

2. In combination, a closed casing adapted to be filled with liquid, a partition extending across said casing and dividing it into two chambers, and means for moving said partition to vary the relative sizes of said chambers, said partition having a part slidable thereon in the plane of the partition between a position in which the partition constitutes a solid barrier and a position in which communication is established between said chambers past said partition, and spring means yieldingly holding said part in the first-mentioned position, an end of said part being so disposed that the pressure in advance of the moving partition is effective to move said part against the resistance of said spring means.

In testimony whereof, I sign this specification.

STEFAN GOBOS.